_United States Patent_ [19]

Demarest et al.

[11] 4,427,296

[45] Jan. 24, 1984

[54] ELECTRO-OPTICAL MEASURING SYSTEM

[75] Inventors: Frank C. Demarest, Killingworth; Richard A. Iderosa, Rocky Hill, both of Conn.

[73] Assignee: Zygo Corporation, Middlefield, Conn.

[21] Appl. No.: 299,209

[22] Filed: Sep. 3, 1981

[51] Int. Cl.[3] .................. G01B 11/00; G02B 5/14
[52] U.S. Cl. ..................... 356/387; 250/239; 356/256; 356/372
[58] Field of Search ............. 356/372, 380, 384–387, 356/398, 256; 250/239, 560

[56]           References Cited

U.S. PATENT DOCUMENTS

| | | | |
|---|---|---|---|
| 3,892,962 | 7/1975 | Whited | 250/239 |
| 3,907,439 | 9/1975 | Zanoni | 250/560 |
| 4,074,938 | 2/1978 | Taylor | 250/560 |
| 4,097,158 | 6/1978 | Dehait | 250/560 |

FOREIGN PATENT DOCUMENTS

| | | | |
|---|---|---|---|
| 2310204 | 9/1974 | Fed. Rep. of Germany | 356/385 |
| 54-73660 | 6/1979 | Japan | 356/372 |

OTHER PUBLICATIONS

Taylor, F. M., "Using A Laser Micrometer for Precision Control of Wire Diameter & Position on a CV Line", Proc. 13th, 23rd, Intnat, Wire & Cable Symposium, Atlantic City, N.J., Dec. 3–5, 1974, pp. 326–329.
Group, "The Photoelectric Astrolabe Type II", Chinese Astronomy, vol. 1, No. 1, 6/77, pp. 79–87.
Leonard, M., "Digital Non Contact Gages for the Metals Industry", Proc. 19th Intern. Iron & Steel Instrum. Sym., Pittsburgh, Pa., Mar. 17–29, 1979, pp. 15–25.

_Primary Examiner_—William H. Punter
_Attorney, Agent, or Firm_—Milton Zucker

[57]                 ABSTRACT

An electro-optical measuring system is described wherein a laser or light beam is precisely translated in a straight line perpendicular to the direction of propagation of the beam at a uniform, repeatable speed to define a time-varying sensing field whose energy is picked up by a photosensor which yields an output signal. An object whose dimension is to be measured is inserted in the field whereby the output signal of the photosensor takes the form of a pulse whose leading edge is developed by the traversal of the beam across one edge of the object, thereby blocking passage of the energy to the photosensor. The trailing edge is developed by the traversal of the beam across the opposite edge of the object thereby restoring the energy to the photosensor. The width or time duration of the pulse is a measure of the distance between the two edges. Measurements of exceptional precision are obtained by a circulation reducer in the light path of the translated beam to substantially eliminate convection currents in the air, further precision is obtained by using group delay equalization in the edge sensing signal processing to reduce systematic errors due to variations in edge pulse width, and by using analog interpolation to provide high resolution measurement of the location of the edge of the object.

7 Claims, 10 Drawing Figures

ELECTRO-OPTICAL MEASURING SYSTEM

BACKGROUND OF THE INVENTION

1. Field of the Invention

The present invention relates generally to an electro-optical measuring system, and more particularly to a system which employs a laser or light beam to scan the object whose dimension is to be measured, to provide highly precise measurements.

2. The Prior Art

For the accurate measurement of the diameter, position, or thickness of soft, delicate, hot, or moving objects, non-contacting measuring systems must be used. Prior-art devices of this character include capacitive gauges, eddy-current gauges, air gauges, gamma and X-ray gauges, and optical gauges. Only the optical and nuclear gauges can work at distances greater than a small fraction of an inch with sufficient sensitivity. The nuclear gauges permit large working distances; however, they are extremely expensive and susceptible to systematic errors due to slight variations in the chemical composition of the object being measured.

Optical gauges have advantages because of the nature of light itself. The principal advantages are:

1. They do not require direct mechanical contact between the gauge and the object to be measured;
2. The distance from the gauge to the object to be measured can be large;
3. Light variations are directly convertible to electrical signals;
4. The response time is limited to that of the photosensor and its electronics;
5. The measurements are independent of the chemical composition of the object; and
6. Measurements can be made at a rapid rate, e.g. 5-10x faster than traditional gauging devices.

Prior-art optical gauges employ various techniques to produce a scanned light beam, to measure the location of the edge of an object, and to measure the time interval between the occurrence of two sensed edges.

Such gauges have been available with accuracies of the order of 2.5-12.5 micrometers, depending on the size of the object being measured. For example, Petrohilos U.S. Pat. No. 3,905,705 issued Sept. 16, 1975 discloses an optical measuring apparatus wherein the size of an object is measured by counting the number of constant frequency pulses which occur between two edge pulses. This method yields a measurement precision of approximately 12.5-25 micrometers for a range of object dimensions up to 50 millimeters, although it is more accurate with objects of small diameters, such as optical fibers.

Altman, et al., U.S. Pat. No. 4,168,126 issued Sept. 18, 1979 discloses an optical measuring apparatus which produces an extremely linearly scanned light beam. However, when objects with diameters of 10 millimeters or more are being measured, fluctuations occur in the measurement. These fluctuations follow a 1/f noise spectrum so that averaging does not significantly reduce them, thus limiting the possible accuracy of the system to the order of 2.5-5 micrometers when measuring a 50 millimeter object.

The assignee of the instant invention has been marketing a laser measuring system developed by coworkers of the applicants herein which uses a collimated scanned beam instead of the focused beams used by Petrohilos and Altman et al., obtaining accuracies of 2.5-5 micrometers with objects of the order of 100 millimeters in size, by using the exact edge sensing technique disclosed in the Zanoni U.S. Pat. No. 3,907,439, issued Sept. 23, 1975, along with other improvements to overcome systematic errors.

Other scanned beam systems have also been constructed with rotating mirrors, prisms and gratings operating in conjunction with optical lenses and/or mirrors to produce reasonably precise measurements, i.e., 2.5-25 micrometers.

While these prior-art techniques are useful for some measurements, they cannot be used for exceptionally precise measurements required in many industrial operations. For example, in the metal fabrication industry many parts have dimensions with tolerances of 2.5-5 micrometers. The "gauge makers" rule requires that the measuring apparatus has a precision 1/10 this tolerance i.e., 0.25-0.5 micrometers.

OBJECT OF THE INVENTION

In view of the foregoing, it is the main object of this invention to provide an electro-optical system which makes use of a scanned laser or light beam to effect dimensional measurements to an extremely high order of precision, of the order of 0.12-0.5 micrometers even with relatively large objects with dimensions of 50-100 millimeters.

Also an object of the invention is to provide an extremely precise electro-optical measuring system of relatively simple design which operates reliably and which can be manufactured at relatively low cost.

These and other objects will be obvious from the following description of the invention.

STATEMENT OF THE INVENTION

In our work on the development of a laser measuring system capable of extreme precision, we have discovered that the principal source of random errors, which occur in all the prior art systems, and which limit the precision of the measurements to at best 2.5 micrometers in measuring a 50 millimeter object, is variation in the temperature and hence the refractive index of the air through which the scanned beam passes during the measuring period and that this source of error can be eliminated simply by reducing circulation in that air by preventing convection currents from being established, most preferably by the use of very narrow shielded passages for the scanned beams, of proper dimensions to assure that almost all heat transfer occurs by conduction and radiation and very little to none by convection. This simple expedient can radically improve the performance of all of the prior art systems, by more than half an order of magnitude.

In addition, we have found that further improvement in precision is provided in telemetric systems using focused beams by correction of the systematic errors in the determination of coincidence of the center of the scanned beam with the edge of the object, most preferably using group delay equalization for the purpose. A further improvement is obtained by providing means, most preferably, analog interpolation to provide high resolution measurement of the time between edge crossings.

Our complete system includes known elements including (1) a source of radiant energy, most preferably coherent laser energy, to produce a narrow beam of collimated light, (2) means for converting the narrow beam into a uniformly rotationally scanned beam, (3) means for converting the rotationally scanned beam into a parallel scanned beam, (4) desirably, means for focusing said parallel scanned beam adjacent to the edge of the object to be measured, (5) means for collecting and photosensing the portion of the parallel scanned beam which passes by said edges of said object being measured, (6) means for processing the photosensor output to produce a signature indicating the coincidence of the center of the parallel scanned beam with said edges of said object being measured, and (7) means for processing said signatures to indicate the size of the object being measured, and new elements including (8) means for preventing variations in the refraction index of the air through which said rotational and parallel scanned beams pass during the measurement period, most preferably very narrow shielded passages of proper dimensions to insure heat transfer by means other than convection, (9) desirably, when focusing means (4) are used, means, most preferably, group delay equilization to substantially reduce systematic errors in sensing the coincidence of the center of said parallel scanned beam with the edge of the object due to changes in the beam size in the measuring plane along the scanned path, and (10) desirably, means, most preferably analog interpolation to provide high resolution of the order of ±1 nanosecond in measuring the timing of the signals locating the edges of the object to be measured.

THE DRAWINGS

In the drawings,

FIG. 1 schematically illustrates an elementary form of a scanned laser beam electro-optical measuring system, as shown in the prior art.

Figure 5:
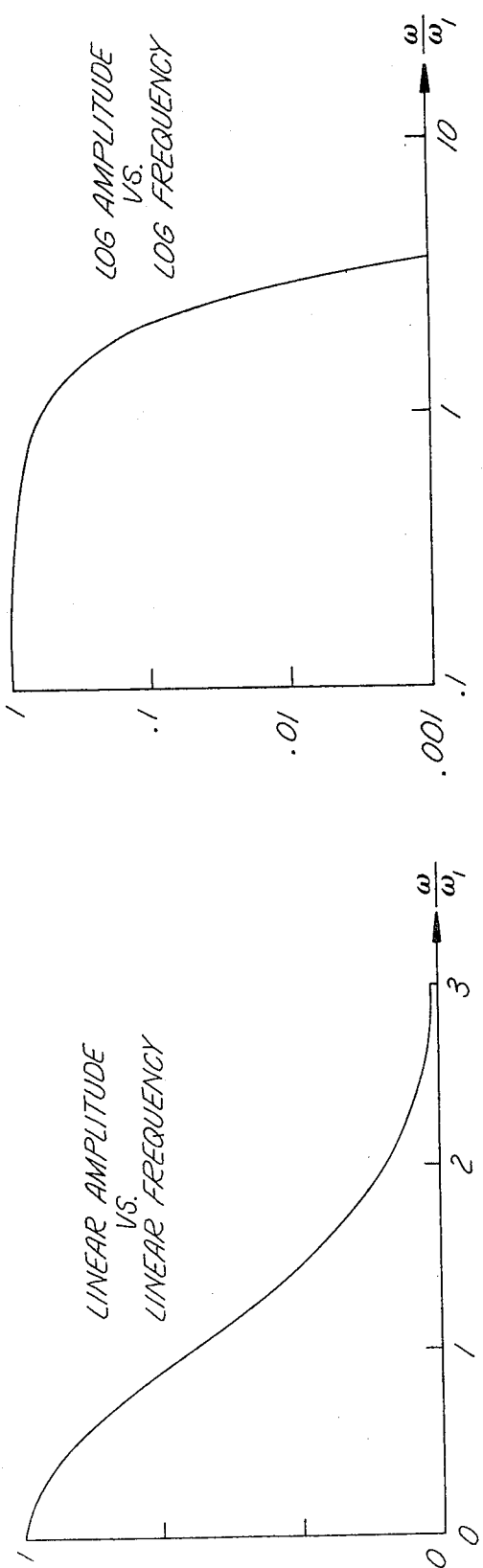

FIGS. 5a-c shows the frequency spectra for the first and second derivatives of the edge sensing signals.

Figure 2:
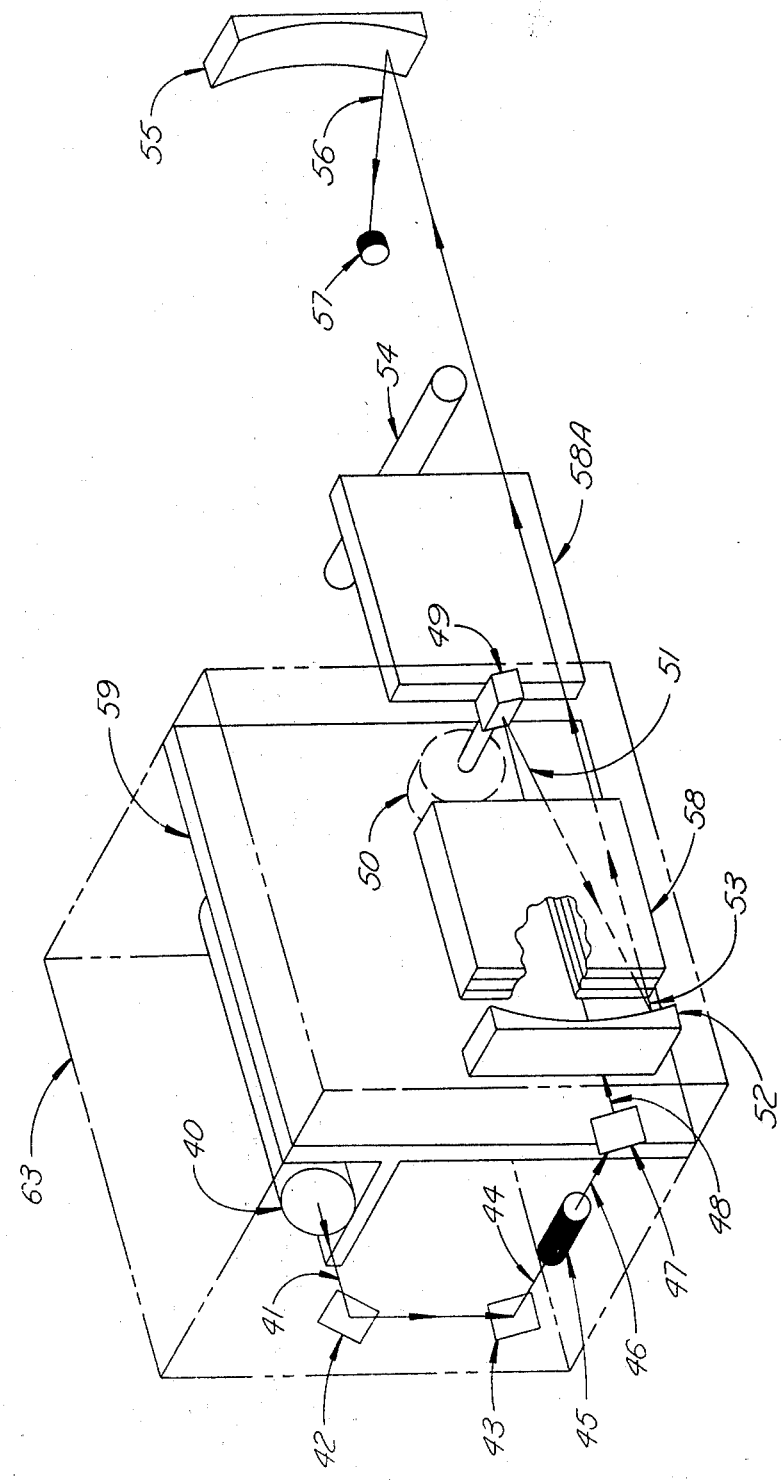
FIG. 2 illustrates schematically a perspective view of the electro-optical measuring system of the instant invention.
Figure 6:
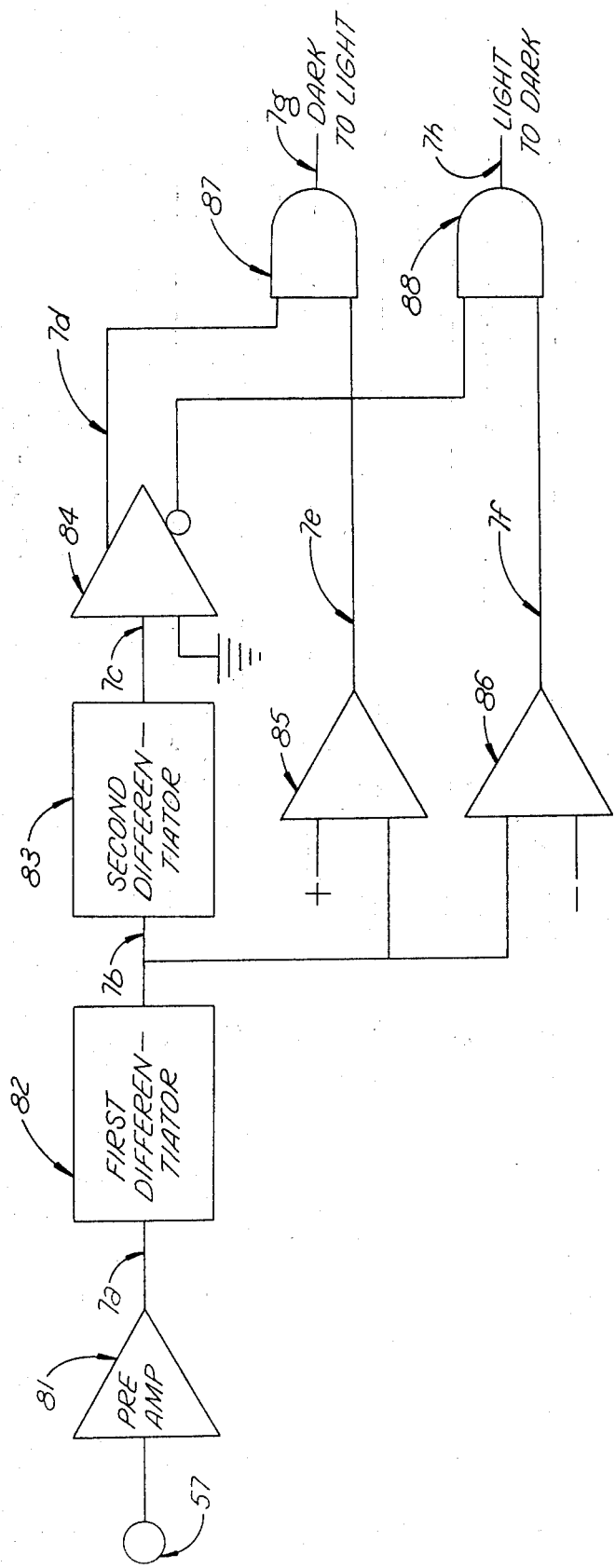

FIG. 6 is a block diagram of the electronic circuitry for processing the signals produced by the photosensor in the system shown in FIG. 2.

Figure 7:
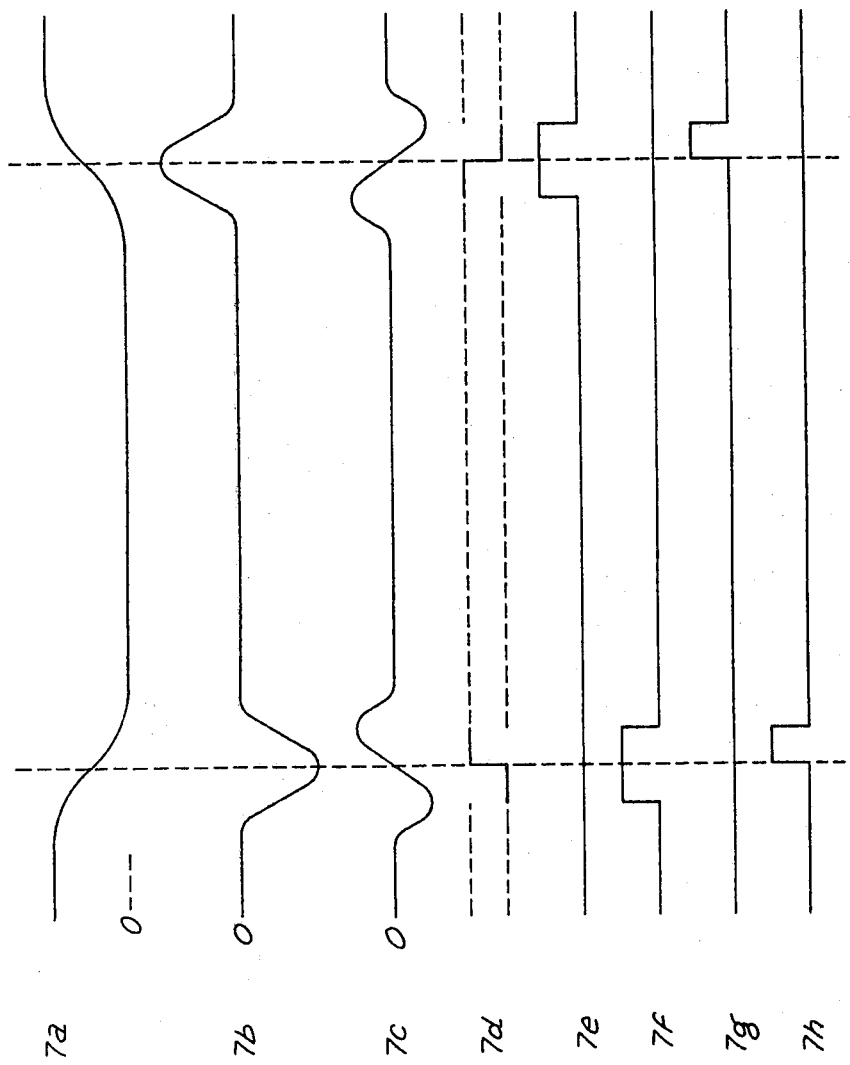

FIG. 7 pictorially illustrates the waveforms of the signals of the circuitry in FIG. 6.

Figure 8:
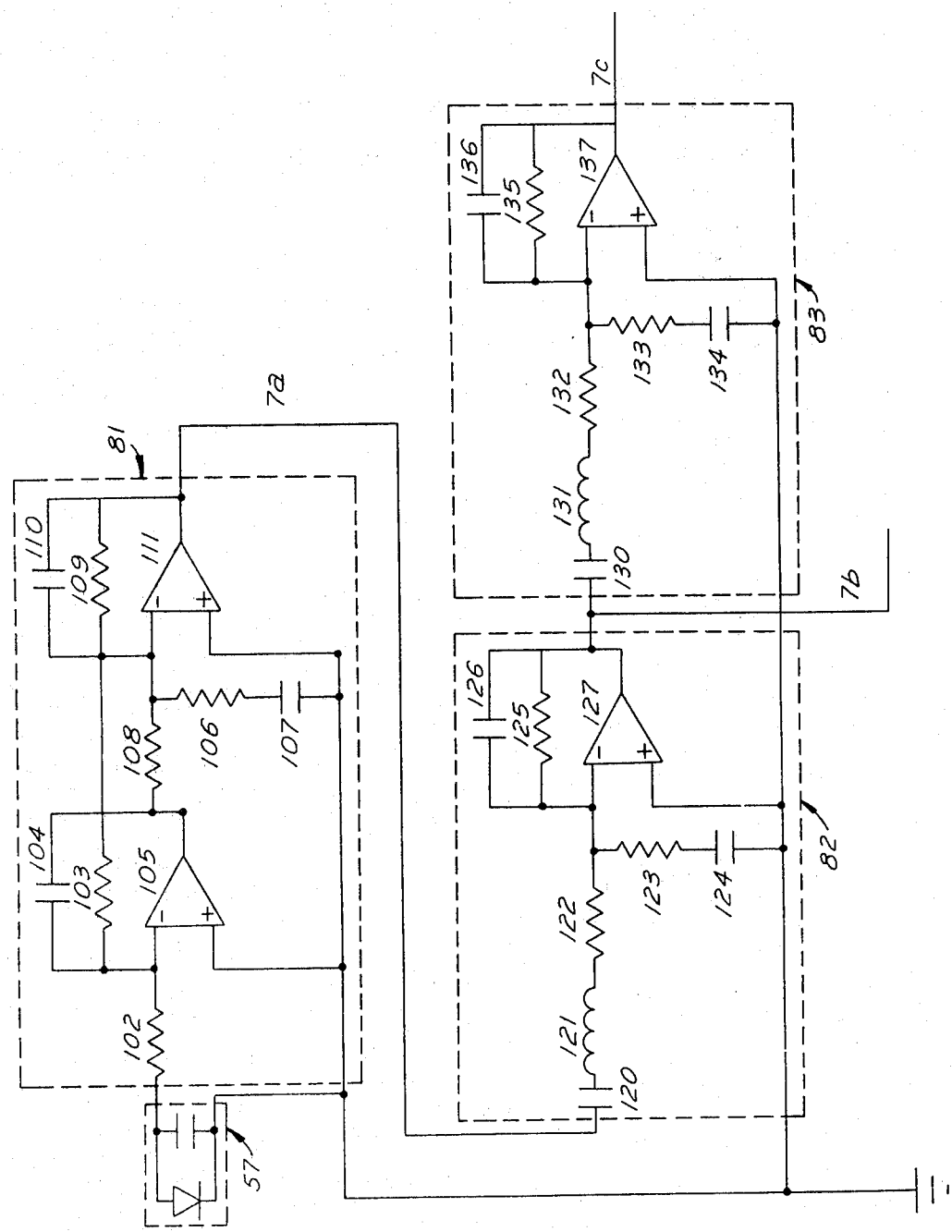

FIG. 8 illustrates the electronic circuitry used in providing group delay equalization.

DETAILED DESCRIPTION OF THE INVENTION

While the technique has application for a wide range of radiation sources, the following description is taken by way of example with respect to an optical measuring system. The term "radiant energy" as used herein includes, but is not limited to, electromagnetic energy of all frequency ranges.

Figure 1:
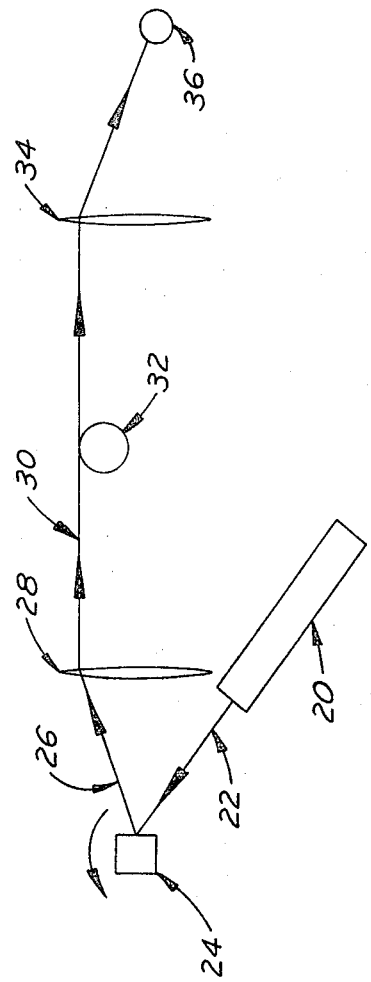

Referring to FIG. 1 of the drawings showing a simplified prior art device, a laser (20) produces a narrow beam of light (22) which is directed onto a uniformly rotating mirror (24), which may be multifaceted as shown, to produce a rotary-scanned beam (26). A collimating optic, such as a lens (28) converts the rotary-scanned beam (26) into a linear-scanned beam (30), which passes by an object to be measured (32), and then to a collecting optic, such as a lens (34) which focuses the beam onto a photosensor (36). The diameter of the object to be measured (32) is directly proportional to the length of time that the object to be measured cuts off beam (30).

The light source (20) may be a tungsten bulb, xenon bulb, light-emitting diode or other source of energy, but is most preferably a gas laser. The photosensor (36) may be a vacuum photodiode, photomultiplier, silicon photocell, or a PIN photodiode.

Since beam (30) has a finite diameter, typically 0.1–1.0 millimeters, it is necessary to pinpoint the exact time at which the center of the linear-scanned beam passes the edges of the object to be measured. This is done, most preferably by using the technique disclosed in Zanoni U.S. Pat. No. 3,907,439 issued Sept. 23, 1975, which is assigned to the assignee of this application. This is illustrated in detail in FIGS. 6 and 7.

FIG. 2 is a schematic diagram illustrating a perspective view of the electro-optical system of the instant invention. A gas laser (40) provides optical energy for the narrow, nearly collimated beam (41). Mirrors (42) and (43) reflect the beam through beam shaping optical elements (45) which can be used to optimize the optical system performance. The outcoming beam (46) is reflected by mirror (47) into beam (48) which is parallel to the optical axis of the collimating optic (52). The beam (48) is then rotationally scanned by the optical manner (49) whose reflective surface is located at the back focus of the collimating optic (52). The collimating optic (52) converts the rotationally scanned beam (51) into a parallel scanned beam (53). The optical scanner (49) is rotated by the motor (50). The motor (50) provides a precisely uniform rotation of the optical scanner (49). As the laser beams (48), (51), and (53) propagate through the optical cavity, they pass through a circulation reducer (58) which prevents them from quivering due to variations in refractive index of the air, thereby minimizing the measured dimensional uncertainties. The parallel scanned beam (53) passes over the edges of the object (54) being measured. The parallel scanned beam (53) is then collected and focused by collecting optical element (55) onto a photosensor (57). The photosensor output is then processed electronically as described below.

The performance of an electro-optical measurement system can be greatly enhanced by reducing the amount of heat generated on the system of FIG. 2. Heat generation in the optical system causes temperature gradients and thusly air circulation in the enclosure. The effect of the temperature gradients is to cause the direction of propagation of beams (51) and (53) to fluctuate in the optical cavity due to variations in refractive index of the air. Nonuniform temperature gradients cause random fluctuations of air's refractive index that cause the beam direction to quiver.

The pictorial schematic, FIG. 2, illustrates how these effects can be minimized. The laser (40) is placed above the other optical components because it is the major heat source. By placing the laser (40) on the top of the optical plate (59), the air circulation (turbulence) is minimized in the optical path. The motor (50), the other heat source, is isolated from the optical path by the optical plate (59) to which it is mounted. This allows heat to be uniformly conducted along the plate thereby reducing temperature gradients. The motor (50) should dissipate the minimum amount of power.

Figure 3:
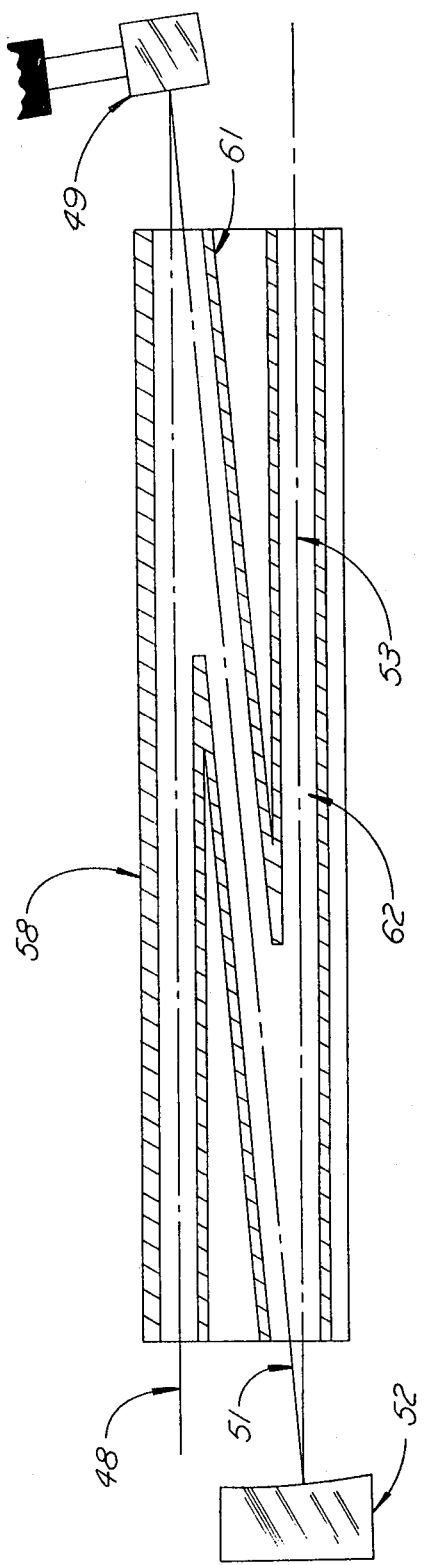
FIG. 3 illustrates schematically the circulation reducer of the instant invention, in partial cross-section.

Variations in temperature of the air through which the beams (41), (44), and (48) pass have little effect on the measurements, in the absence of rapid circulation, since the time of measurement is a small fraction of a second, and slow temperature changes will produce no errors. However, the scanned beams (51) and (53) must travel through the air during the scanning operation, so that if convection has occurred with accompanying temperature and resultant refractive index variations, undesirable random errors occur, which we have found are of sufficient size to limit precision to at best 2.5 micrometers in a scan sufficient to measure a 50 millimeter or larger object. Hence, some means is needed to suppress the temperature gradient which would induce circulation of the air through which the scanned beam passes between the scanning mirror and the object to be measured. A simple preferred means (58) is illustrated in FIG. 3.

The circulation reducer (58) is located between the collimating optic (52) and the scanner (49) on the one hand, and between the optic (52) and the object to be measured (54). The circulation reducer (58) is comprised of a series of parallel plates (61). The beams (51) and (53) are directed through the plates (61) by the scanner mirror (49) and the collimating optic (52). A second circulation reducer (58a) for the measuring beam (53) is provided outside of the instrument enclosure (63).

Obviously, the farther from the object any deviation in the beam occurs, the larger will be the error. Close to the object, the possible error is sufficiently small so that shielding is not essential up to the object itself, and a small gap can be tolerated. Small gaps, of the order of 10-20 millimeters, are desirable between the optics (49) and (52) and the circulation reducer (58) to prevent the formation of circulation cavities. In FIG. 2, the cap between the circulation reducer (58) and scanner (49) is shown as larger than it is in practice in order to permit all of the elements to be clearly shown.

Heat can be transferred through the cavities (62) by conduction, convection, and radiation. The circulation reducer (58) of FIG. 3 allows heat to be transferred predominately by conduction and radiation since these forms of heat transfer do not produce circulatory flows in the cavities (62). This means that as the beams (51) and (53) propagate through the cavities (62), they will not radomly change their direction of propagation, but rather will be deflected through some small angle and remain there once the cavity has reached thermal equilibrium.

Therefore, conductive and radiative heat transfer must be enhanced through the optical cavities (62). Conductive and radiative heat transfer can be maximized by choosing the correct geometry of the circulation reducer (58). Radiative heat transfer can be enhanced by providing plates (61) that have low reflectivity. This can be accomplished by using a material with an appropriate surface finish. The circulation reducer (58) shown in FIG. 3 is black anodized aluminum. The type of finish used, however, is dependent on the wavelength at which the energy is emitted.

Heat must be conducted through the plates (61). As the beams (48) and (53) go between the plates (61), it is similar to their going through an enclosure. It can be shown analytically that heat transfer by conduction primarily takes place when plate spacing (61) is small. Based on analysis and experiment, the following relation was obtained for plate spacing, $\delta$, for a given plate height, H, and temperature differential, $\Delta T$.

$$\delta \leq \left[ \frac{3HT\nu^2}{gPr\Delta T} \right]$$

where g is the gravitational acceleration, Pr=Prandtl number, $\nu$=viscosity. T is the nominal temperature at which the above properties are evaluated. In the above equation, the SI units for the various quantities are: T, °K.; g, m/sec$^2$; H, m; $\nu$, m$^2$/sec; $\delta$, m. Therefore, the larger the temperature differential, $\Delta T$, the closer the plate spacing, $\delta$, to have conductive heat transfer. If the circulation reducer (58) were removed, the circulation and the measured uncertainty would increase by at least a factor of 5.

An enclosure (63), shown in dotted lines in FIG. 2, housing the various components, further minimizes the influence of environmental thermal changes. Air circulation outside of the instrument enclosure as the beam (53) goes between the enclosure and the object (54) also affects the measured dimensional uncertainties. This is prevented for the most part by the outside circulation reducer (58a). The beam (51) passes through an optical window (not shown) which is a part of enclosure (63).

The accuracy of this measuring system depends to a great extent on how precisely the edge of the object is sensed by the scanned laser or light beam (53).

In the following discussion we will assume that the laser beam has a Gaussian intensity distribution although other light distributions may be applicable.

Figure 4:
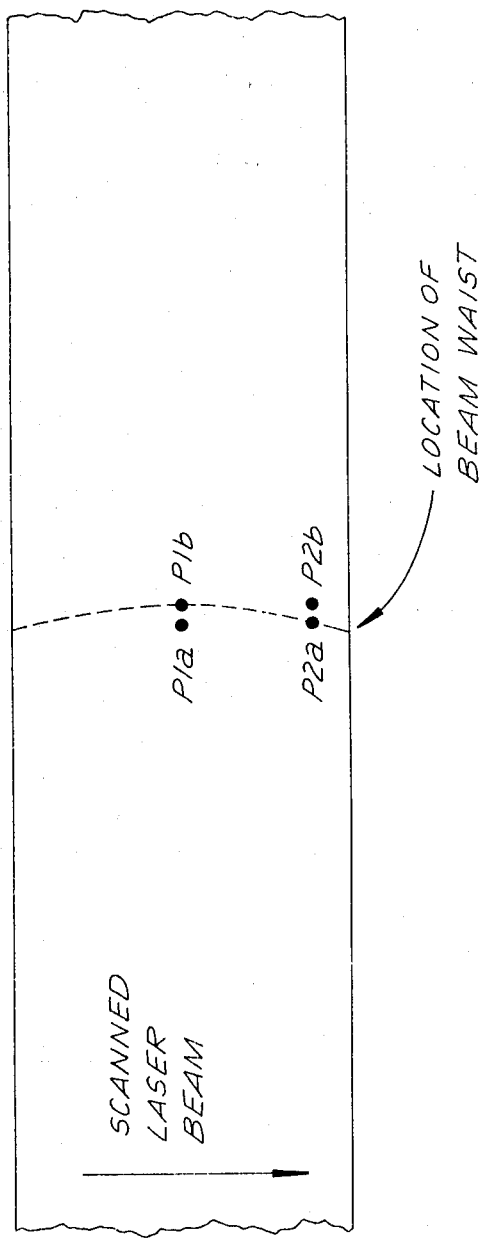
FIG. 4 shows the variation in spot size over the measurement region.

Measurement errors can be provided in this system by defects and contaminants on the optical surfaces because they modulate the scanned beam. This source of error can be reduced by arranging the optical elements (45) to focus the light so that the diameter of the scanned laser beam is much smaller at the object being measured than it is at the optical surfaces. When the scanned laser beam is focused in this manner, the line of sharpest focus is slightly curved, as shown by the dashed line in FIG. 4. If an object is placed with its edges at P1a and P2a in FIG. 4, the scanned beam will be larger at P1a than at P2a. If the same object is moved away from the light source slightly, the scanned beam is now larger at P2b than at P1b. Thus, there are systematic changes in edge pulse width for which compensation is required.

The diameter of the scanned beam as it passes the object determines the location of the frequency spectrum of the resulting signal. If the group delay of the electronics is kept constant over the frequency range encountered, the measured size of the object will not change as it is moved through the measuring region. Since the edge sensing relies upon the zero crossing of the second derivative of the light signal, and the scanned beam is Gaussian, analysis of the delay produced by the electronics is fairly simple.

The first derivative of the signal has a Gaussian shape since the laser beam has a Gaussian intensity distribution. Represented mathematically, the shape of the first derivative is:

$$f(t) = e^{-\frac{1}{2}(t/t_1)^2} \quad \text{where } t_1 = \frac{\text{beam diameter}}{4 \cdot \text{beam velocity}} \tag{1}$$

In the frequency domain, the spectrum of the first derivatives has the same shape (FIG. 5a) which may be represented by:

$$F(\omega) = e^{-\frac{1}{2}(\omega/\omega_1)^2} \text{ where } \omega_1 = 1/t_1 \quad (2)$$

FIG. 5b shows this on logarithmic axes.

The spectrum of the second derivative of the signal is then:

$$G(\omega) = \omega e^{-\frac{1}{2}(\omega/\omega_1)^2} \quad (3)$$

This spectrum has its peak at $\omega/\omega_1 = 1$ as shown in FIG. 5c. The processing electronics will delay this signal by a length of time determined by the group delay of the circuitry at this frequency. The group delay of the processing electronics is defined by the derivative of phase of the transfer function:

$$D(\omega) = -\frac{d\theta(\omega)}{d\omega} \quad (4)$$

FIG. 8 shows the implementation of the preamplifier and derivative forming circuitry shown in FIG. 6. To provide proper group delay equalization, the circuit components are first selected using conventional design techniques to provide the proper gain and frequency response for the application. Resistor-Capacitor networks (106-107, 123-124, 133-134) are frequently required to stabilize the operational amplifiers (111, 127, 137). The R C time constants of these networks should be chosen so that they are the same as the dominant poles of the operational amplifiers (111, 127, 137). The resistors (122, 132) and inductors (121, 131) in the differentiators are then adjusted with the aid of a computer program to provide the most constant group delay over the frequency range near $\omega_1$. The calculations done by the computer must include the characteristics of all the components shown in FIG. 8.

The signal processing shown here is functionally the same as that presented by Zanoni in U.S. Pat. No. 3,907,439. Referring to FIGS. 6 and 7 the light collecting optics direct the light onto the photosensor (57), producing a current. The preamplifier (81) converts this current to a voltage and amplifies it to a usable level. FIG. 7a shows the signal output from the preamplifier as the laser beam passes across an object. The first derivative of this signal (FIG. 7b) is provided by the first differentiator (82). The second derivative of the light signal (FIG. 7c) is provided by the second differentiator (83). A comparator (84) senses the zero crossing of the second derivative and provides a digital output (FIG. 7d). Two other comparators (85, 86) sense when the first derivative exceeds predetermined limits and provide digital outputs (FIGS. 7e, 7f). A pulse (FIG. 7g) representing a dark to light transition of the light signal is generated by a logical AND (87) when comparators (84, 85) sense the first derivative above a positive threshold and the second derivative changing from positive to negative.

A pulse (FIG. 7h) representing a light to dark transition of the light signal is generated by a logical AND (88) when comparators (84, 86) sense the firt derivative below a negative threshold and the second derivative changing from negative to positive.

Equally as important as sensing the edge of the object accurately, is measuring the time between two crossings so that the object size may be calculated. With the present state of the art, time measurements with a time resolution of about ±1 nanosecond is required. There are four techniques for achieving the resolution:

1. A very high frequency clock, e.g. 1 GHz, can be used. While this approach is obvious and straightforward, it is costly in practice due to the complications introduced by the high frequency.
2. A delay line vernier can be used. This method is not economical with resolutions smaller than 3-5 nanoseconds.
3. A dual vernier interpolation using two high frequency clocks with slightly different frequencies can also be used, see Hewlett-Packard Journal, August 1978 (pages 2 to 11). This technique is quite complex and also costly.
4. An analog interpolation can be done by integrating and measuring a pulse of constant height and width equal to the delay between the edge being measured and the time base.

We have chosen the fourth technique which is illustrated in Hewlett Packard Journal, September 1980, pages 21 to 31, and specifically on page 23. With analog interpolation, the measured interval is the sum of the integral number of clock periods which are counted digitally and the leading and trailing fractional clock periods which are measured by the interpolator. An analog integrator is normally reset. When the edge is sensed, the integrator begins integrating at a constant rate. When the second clock pulse after the edge is sensed occurs, the integration is stopped, and the stored value is immediately measured. With this method, the integration time will be between one and two clock periods. Because of the numerous sources of error, calibration pulses with widths of one and two clock periods are periodically measured. With self-calibration, most error sources cancel out and the length of the measured time interval is:

$$t = \left( N + \frac{V_1 - V_2}{V_{c2} - V_{c1}} \right) t_c \quad (5)$$

where:
N = integral number of clock cycles between edges
$t_c$ = clock period
$V_1$ = integrator voltage after beginning of measured interval
$V_2$ = integrator voltage after end of measured interval
$V_{c1}$ = integrator voltage after calibration pulse $1 \cdot t_c$ wide
$V_{c2}$ = integrator voltage after calibration pulse $2 \cdot t_c$ wide Obviously, changes can be made in the embodiment of the invention illustrated, and the invention is defined in the claims.

What is claimed:
1. In an electro optical measuring system comprising (1) a source of radiant energy which produces a narrow collimated beam, (2) means for converting said narrow beam into a uniformly rotationally scanned beam, (3) means for converting said rotationally scanned beam into a parallel scanned beam, (4) means for collecting and photosensing the portion of said parallel scanned beam which passes by the edges of an object being measured, (5) means for processing the photosensor output to produce signatures indicating the coincidence of the center of said parallel scanned beam with said edges, and (6) means for processing said signatures to indicate the size of said object, and (7) in which system the path of said scanned beams between means (2) and said object to be measured is occupied by ambient air, the improvement which comprises providing (8) very narrow shielded passages for said path of said scanned beams in said region (7), of proper dimensions to insure that heat transfer in said region (7) occurs almost completely by conduction and radiation rather than by convection.

2. The system of claim 1, in which said energy source is a laser.

3. The system of claim 1, in which said parallel scanned beam is focused adjacent to said object being measured to reduce errors due to irregularities in the optics, and the systematic variations of focus are compensated for by providing means (8) to substantially reduce the systematic errors in sensing the coincidence of the center of said parallel scanned beam with the edge of the object due to changes in the beam size in the measuring plane along the scanned path.

4. The system of claim 3 in which means (8) are provided by using group delay equalization.

5. The system of claim 3 in which means (9) are provided to obtain a resolution of ±1 nanosecond in measuring the timing of the signals locating the edges of the object to be measured.

6. The system of claim 3 in which means (9) are provided by applying analog interpolation to the said signals.

7. The system of claim 1, in which means (5) include means to differentiate the photosensor signal obtained as said scanned beam pass an edge of said object being measured to produce a second signal with maximum intensity at points corresponding to said edge of said object, means to further differentiate said second signal to produce a third signal of zero intensity at points corresponding to said edge of said object, means to feed a portion of said second signal and said third signal to a switch which passes said third signal only for a limited period adjacent the peak of said second signal to produce said signature indicating the coincidence of the center of said parallel scanned beam with said edge.

* * * * *